United States Patent Office 3,702,276
Patented Nov. 7, 1972

3,702,276
METHOD OF MAKING HIGH IMPACT STRENGTH GLASS FIBER-PLASTIC COMPOSITES
John E. Ward, Jr., Granville, Ohio, assignor to Owens-Corning Fiberglas Corporation
No Drawing. Filed Jan. 13, 1969, Ser. No. 790,859
Int. Cl. B29h 9/04
U.S. Cl. 156—181
10 Claims

ABSTRACT OF THE DISCLOSURE

A protective coating material applied to glass fibers prior to being drawn together into a strand and which when partially cured gives the strand a high degree of integrity. Organic resins reinforced by the strand have high impact strength. A preferred example of the coating material comprises a copolymer of vinyl acetate and normal methylol acrylamide.

BACKGROUND OF THE INVENTION

Glass fibers have long been used as a reinforcement for various plastics. Substantially all of the glass fibers which are used to reinforce plastics are produced as continuous filaments from small molten streams of glass. Immediately after the streams are solidified into continuous filaments, they are coated with a protective material which separates the fibers and keeps them from abrading each other. Thereafter, the coated fibers are gathered together into a strand, and the strand is wrapped into a coiled package which is thereafter dried.

In one of the early stages of development of the art, the fibers were coated with an aqueous dispersion of starch to protect the fibers during the mechanical handling which is necessary before the fibers become embedded in the plastic. The strands of the fibers were either woven into a fabric or were swirled into mats. In either case, the starch was burned off of the fibers of the fabric or mat, and a coating of a thermoplastic resin was applied to the fibers before the fibers were immersed in the matrix resin.

In a later development, an aqueous dispersion of an organic resin was applied to the fibers in place of the starch, to provide a resin coated fiber strand which could be embedded directly in the matrix plastic. In a still further development, this strand was chopped into short lengths of between an eighth and one-half inch, and the chopped strand was then embedded in the matrix plastic. In one procedure which has been developed, a strand chopper is added to the spray gun used to spray the resin onto a form, so that the chopped strand and resin are co-deposited on the form. In another type of operation, the resin coated strand is uncoiled from the package and fed through chopping apparatus which produces bulk chopped strand. The resin coating is kept in a thermoplastic state in order that the strand will have the necessary flexibility for weaving, mat forming, or chopping. It will be apparent that a thermoset resin would make the strand too stiff for subsequent processing. The resins which have been used have been soluble in the matrix resin, and the chopped strand has filamentized when mixed with the matrix resin prior to cure of the matrix resin. The prior art resin coated chopped strand has had high tensile strength but relatively low impact strength.

An object of the present invention is the provision of a new and improved coating for strand that is to be used as a reinforcement of plastics, and which when used in the chopped condition will produce a composite having greatly increased impact strength.

Another object of the invention is the provision of a new and improved coating for strand that is to be used as a reinforcement of plastics which is flexible and yet substantially insoluble in the matrix resin.

Further objects and advantages of the invention will become apparent to those skilled in the art to which the invention relates from the following description.

SUMMARY OF THE INVENTION

According to the present invention it has been discovered that the impact strength of a plastic reinforced by short lengths of glass fibers is greatly increased if the short length of fibers are grouped together in the form of strand, rather than being dispersed throughout the resin as individual filaments or small groups of filaments. According to the invention, the resin which bonds the fibers together into a strand is of low or intermediate molecular weight, so that it is flexible, but is crosslinked to be relatively insoluble and hold the fibers together into a strand. The remaining reactivity provides controlled coupling with the matrix resin.

According to the invention, the strand forming resin has two degrees of reactivity, the first of which is used to crosslink the resin prepolymer, and the second degree of which reacts with the matrix resin to provide a controlled degree of attachment between the surface of the strand resin, and the matrix resin. Because this second stage is utilized at the time the coating on the fibers is generally immobile or in a solid state, the degree of bond which is achieved between the strand coating and the matrix resin is a limited or controlled one, which allows the bond between the strand and the matrix resin to yield under a concentrated load, such as occurs during impact. Because the fiber coating forming the strand is immobile at the time of the second stage reaction, only random molecules, spaced apart at relatively large molecular distances, become reacted with the matrix resin. Concentrated loads cause some of these bonds to be broken and/or the softer coating resin to yield to allow the strand to move and regroup. It appears that dispersed fibers are so firmly bonded to the matrix resin that concentrated loads break the fibers one at a time, sequentially.

According to the invention, different types of reactivity are used in the respective stages so that the first stage of reactivity can be caused to occur generally independently of the second stage of reactivity. The types of reactivity can be controlled by utilizing mechanisms requiring either different degrees of heat or different catalysts. It will be seen that the second stage reaction can be prevented from taking place in the strand resin by omitting the catalyst, for the second stage reaction, from the strand. The second stage of reactivity should be the same as that used in the matrix resin, and by incorporating the catalyst for the second stage reaction in the matrix resin, a controlled linkage to the surface of the strand is obtained.

In a preferred form of the invention, individual glass fibers are coated at forming with a water dispersion of a low or intermediate molecular weight copolymer of vinyl acetate and N methylol acrylamide. After the individual fibers are coated with the emulsion, they are gathered together into a strand and wrapped into a coiled package and dried at a tempertaure which causes the copolymer to crosslink by condensation of the methylol groups. The crosslinking of the methylol groups causes the copolymer to set up into a state where it is flexible but substantially insoluble in a solution of a matrix resin. The matrix resin may be a styrene solution of a crosslinking polyester resin, or may be an organic solution of some other unsaturate such as polypropylene, polyethylene, or polystyrene. When the coated strand is mixed with the matrix resin and cured at a temperature above the temperature used to crosslink the coating material, a polymerization of the matrix resin is produced, and a limited number of bonds are produced between the surface of the strand coating and the matrix resin. The limited number of bonds between the solid coating material and the matrix resin become sequentially broken when subjected to concentrated loads, to allow a yielding of the matrix resin relative to the strand, and a consequent redistribution of the load over a number of strands. In addition, the softer nature of the lower molecular weight coating allows a movement of the fibers relative to the matrix resin. A considerable improvement in impact strength is thereby produced.

DESCRIPTION OF THE PREFERRED EMBODIMENTS

EXAMPLE 1

An aqueous dispersion is made of the following materials given in percent by weight:

| Ingredients: | Percent by weight |
| --- | --- |
| Polyvinyl acetate: N-methylol acrylamide copolymer emulsion (50% solids, produced in accordance with Example 1 of Pat. 3,301,809) | 12 |
| AlCl$_3$ aqueous dispersion (28% solids) | 0.6 |
| Glycidoxy propyl trimethoxy silane | 0.4 |
| Polyoxyethylene glycol monooleate | 0.6 |
| Acetic acid | 0.004 |
| Deionized water | Balance |

Eight hundred sixteen continuous filament glass fibers approximately 0.00050 inch in diameter are produced by attenuating molten streams of glass at a rate of approximately 10,000 feet per minute. The glass fibers have a composition taught by Pat. 2,334,961, and immediately after solidification, are pulled over a graphite applicator that is flooded with the aqueous dispersion given above. The coated fibers are brought togeher into a strand by the applicator, and the strand is then wound into a coiled package that is rotated by a revolving spindle which pulls the fibers at a rate of approximately 10,000 feet per minute. A suitable traverse mechanism moves the strand back and forth across the spindle to produce a coiled package approximately 12 inches wide, with an inside diameter of approximately 8 inches, and outside diameter of approximately 12 inches, and tapered sides. The packaged is removed from the spindle and dried in an oven at 265° F. for 8 hours. Thereafter the strand is unwound from the package and chopped into one quarter inch lengths.

A matrix resin mix is made from the following ingredients:

| Ingredients: | Parts by weight |
| --- | --- |
| Unsaturated polyester resin (1 mol phthalic anhydride, 1 mol maleic anhydride, 2 mols propylene glycol cooked to an acid number of 30–35 and diluted with 30% styrene solvent) | 2011.0 |
| Tertiary butyl perbenzoate | 13.2 |
| Benzoyl peroxide | 6.0 |
| Zinc stearate | 80.0 |

The resin mix is produced by charging the polyester resin to a Cowles mixer, and thereafter slowly adding the other ingredients while the mixer is running to thoroughly disperse the ingredients throughout the resin.

A molding premix is made from the following ingredients:

| Ingredients: | Parts by weight |
| --- | --- |
| Above resin mix | 1763.0 |
| Calcium carbonate —325 mesh filler | 315.0 |
| Clay filler | 2832.0 |
| ¼ inch chopped strands given above (98% glass) | 1080.0 |

The molding premix is made by adding the resin mix to a Baker-Perkins sigma blade type mixer, and adding the clay and the calcium carbonate fillers while the mixer is running. After the above ingredients are dispersed in the resin, the mixer is run for an additional 2 minutes to assure a uniform dispersion. Thereafter, the quarter inch chopped strands are blended in, and the mixer is run for an additional one minute period to assure a uniform dispersion of the strand throughout the other ingredients. The molding premix produced as above described has approximately 18% glass by weight.

A test specimen for determining impact strength is made by weighing out a sufficient amount of the premix to fill a flat bottom mold to a depth of 0.100 inch and bringing a cover die down upon the resin with sufficient force to provide a loading of 2,000 pounds per square inch on the resin. The premix is cured under this compression for three minutes at a temperature between 280 and 300° F., following which the molded sheet is removed and cooled. A test specimen approximately one half inch wide and 2½ inches long is cut from the material, and the test specimen is notched, all in accordance with the procedure set forth in the ASTM D–256 test specification. The test specimen is placed in an Izod impact strength testing machine, and the weighted pendulum allowed to strike the cantilevered end of the specimen. The test specimen has a impact strength of between 7.0 and 8.0 foot pounds per inch of width.

By way of comparison, and not according to the invention, glass fibers are coated with a conventional polyvinyl acetate polymer, using the same procedure given above. The conventional polyvinyl acetate coated strand is then chopped and a molding premix made as above described, and when tested, has a notched Izod impact strength of between 3.0 and 5.5 foot pounds per inch of width.

EXAMPLE 2

Coated glass fibers produced as in Example 1 are used as a reinforcement for a polypropylene resin. A powdered reactor flake polypropylene is blended with the coated glass fibers of Example 1 in an 80 to 20 ratio. The matrix resin mix and the chopped coated glass fibers are blended together in a Lodige-Littleford plow blade blender for approximately 30 seconds to form the molding premix. The molding premix is fed into a reciprocating screw type injection molding machine which heats the premix to a temperature of 450° F., and injects the softened premix into a standard ASTM test specimen family mold which produces, among other test specimens, an Izod impact test bar, that is approximately one-half inch wide, one-eighth inch thick, and 6 inches long. The test specimens are stripped from the family mold, and the Izod impact test bar is placed in an Izod impact test machine, and tested using the same procedure given in Example 1. The test specimen has an impact strength of 4.45 foot pounds per inch width.

By way of comparison, and not according to the invention, a test specimen produced using the same procedure excepting that the coated glass fibers have a prior art coating of a noncrosslinking polyvinyl acetate, has an impact strength of 3.2 foot-pounds per inch width.

EXAMPLE 3

The procedure of Example 2 is repeated excepting that the matrix resin used is a polystyrene instead of a polypropylene. Test specimens of this composite have improved impact strength over composites comprising polystyrene reinforced by prior art fibers coated with non-crosslinking polyvinyl acetate.

EXAMPLE 4

The following ingredients are introduced into a reaction vessel equipped with a thermometer, reflux condenser, mechanical agitator, and slow addition funnel:

| Ingredients: | Parts by weight |
|---|---|
| Styrene | 114 |
| Polyvinyl alcohol (83.5% hydrolyzed, 4% Heoppler viscosity—9.0 centipoises) | 4 |
| Ammonium persulfate | 0.3 |
| Water | 76.5 |

The above described charge is stirred and brought to a temperature of approximately 70° F. for approximately 5 minutes. Thereafter, six parts of monomeric N-methylol acrylamide dissolved in 30 parts of water is added slowly over a period of 2 hours. Thereafter, the temperature is raised to approximately 90° C. for an additional hour. The product is cooled and its pH adjusted to a level of approximately 5.5 by the addition of water saturated with ammonia. The resulting 104:6STY:NMA copolymer emulsion has a resin solids content of approximately 50% by weight. The STY:NMA copolymer emulsion is substituted for the ViAc:NMA emulsion in the procedure given in Example 1 to produce coated fibers, and an impact test specimen. The resulting specimen has substantially the same impact strength as does the ViAc:NMA coated strand test specimen of Example 1.

EXAMPLE 5

The following ingredients are introduced into a pressure vessel equipped with a thermometer, mechanical agitator and electrical heating elements:

| Ingredients: | Parts by weight |
|---|---|
| Vinylidene chloride | 70 |
| Polyvinyl alcohol (83.5% hydrolyzed, 4% Hoeppler viscosity—9.0 centipoises) | 4 |
| Ammonium persulfate | 0.3 |
| Water | 70 |

The contents of the vessel are thoroughly mixed at room temperature for approximately 5 minutes. A solution of 6 parts of monomeric N-methylol acrylamide dissolved in 30 parts of water is prepared. One fourth of this material is added to the vessel, the vessel is sealed, and the temperature raised to approximately 60° C. for one hour. Thereafter, another one-quarter part of the N-methylol acrylamide solution is added through an arrangement of valves which prevents the escape of pressure, and the material is stirred, and allowed to react for one-half hour while raising the temperature to approximately 80° C. Thereafter, another fourth of the solution is added and reacted for one-half hour, following which the final quarter of the solution is added, the temperature raised to 95° C. and the materials reacted thereafter for one hour. The contents are cooled, and their pH is adjusted to a level of 5.5 by the addition of water saturated with ammonia. The resulting 64:6 vinylidene chloride: NMA copolymer emulsion has a resin solids content of approximately 46% by weight.

A coating material is prepared using the same procedure given in Example 1, excepting that the above described vinylidene chloride:NMA copolymer emulsion is substituted for the ViAc:NMA copolymer emulsion of Example 1. A test sample is then made using these coated fibers in place of those used in Example 1, and the composite has suubstantially the same high level of impact strength as does the composite produced as described in Example 1.

EXAMPLE 6

A coating material for glass fibers is made as follows:

| Ingredients: | Percent by weight |
|---|---|
| Unsaturated polyester resin (1 mol phthalic anhydride, 1 mol maleic anhydride, 2 mols propylene glycol cooked to an acid number of 30-35) | 1.09 |
| Styrene | 3.6 |
| Emulsifying agent (Pluronic F77) [1] | 1.09 |
| Coupling agent (Gamma methacryloxypropyl trimethoxysilane) | 0.5000 |
| AHCO 185 AE (Cationic Lubricant) [2] | 0.126 |
| AHCO 185 AN | 0.054 |
| Saturated polyester resin (1 mol phthalic anhydride, 1 mol succinic anhydride, 2.3 mols propylene glycol cooked to an acid number of 35-40) | 0.70 |
| Magnesium oxide (−325 mesh) | 1.0 |
| Water | Balance |

[1] Pluronic F77 is a trade name of Wyandotte Chemical Corp. for a condensate of ethylene oxide with a hydrophobic base formed by condensing propylene oxide with propylene glycol.
[2] AHCO 185 AE is a trade name of Arnold Hoffman Co. for the reaction product of tetraethylene pentamine and perlargonic acid and solubilised with acetic acid. AHCO 185 AN is a trade name of Arnold Hoffman Co. for the reaction product of tetraethylene pentamine and caprylic acid solubilized with acetic acid.

The emulsion is prepared by adding one-tenth of the emulsifying agent to the saturated polyester resin and thoroughly mixing therewith, and the the remainder of the emulsifying agent is added to a separate container holding the unsaturated polyester resin and is thoroughly mixed therewith. Thereafter, one-tenth of the water is placde in the container that is agitated by an Eppenbach Mixer, and the saturated polyester is slowly added thereto. The balance of the water is placed in another container that is agitated by an Eppenbach Mixer, and the unsaturated resin mix is slowly added thereto. The glacial acetic acid is added to the coupling agent and thoroughly mixed therewith, and the hydrolyzed coupling agent thus formed is then added to the emulsion of the unsaturated resin. The emulsion of the saturated resin is then added to the emulsions of the unsaturated resin with mixing, and the cationic lubricants are added and thoroughly dissolved therein. Thereafter the magnesium oxide is thoroughly mixed into the emulsion, and the emulsion thereafter is fed to an applicator and applied to glass fibers using the procedure of Example 1. The emulsion is preferably used at room temperature and within one hour from mixing.

The coiled package of coated glass fibers which is produced is immediately thereafter placed in an oven having a temperature of 110° C. and is dried for 24 hours. During this drying process, the water is evaporated and the resin caused to flow together around the magnesium oxide, which produces a crosslinking of the resin through the remaining carboxyl groups. The strand is then chopped and incorporated into a molding premix using the procedure of example 1, to produce a composite having the same general high level of impact strength as does the product produced by the procedure of Example 1.

EXAMPLE 7

The procedure of Example 1 is repeated excepting that the coating materials that are applied to the fibers has the following composition:

| Ingredients | Percent by weight |
|---|---|
| Thermosetting bisphenol-A epoxy acrylate low molecular weight resin devoid of crosslinking agent (Shell Epocryl E-11) | 80 |
| Ethanolamine | 4 |
| Cellosolve acetate | 110 |
| White mineral oil—a highly refined, completely saturated petroleum oil | 10 |
| Thixotropic gelling agent (Thixcin R, which is a trade name of an organic thixotrope sold by the Baker Castor Oil Company, it is a high melting (ca. 85° C.) ester of castor oil) | 8 |

The ethanolamine is a crosslinking agent for the epoxy groups of the oxirane modified acrylic resin. The white mineral oil is a lubricant which tends to come to the surface of the coated strand, to keep the strand coils separated in the coiled package; and during the drying operation, the Cellosolve acetate solvent is evaporated. Thereafter the ethanolamine reacts with the epoxy groups of the acrylic resin to crosslink the same into a flexible polymer that is quite insoluble in organic solvents. The fibers are chopped, and the chopped fibers are incorporated into the crosslinking polyester matrix resin, as given in Example 1, and the composite so made has substantially the same impact strength as given in Example 1.

In general, an improvement in impact strength is obtained with any percentage of the coated strand of the present invention when used in place of the prior art strand having soluble coatings which tend to dissolve in the matrix resin. Difficulty is had in incorporating more than approximately 30% of the coated fiber in the matrix resin, so that the composites will usually comprise from 1 to 30% of the coated strand and 70 to 99% resin. Composites having from 10 to approximately 25% by weight of the coated strand produce desirable composites for most applications, and from approximately 18% to approximately 22% are preferred. The coated strand will usually comprise from approximately 0.5% to approximately 5% of the coating material, with from 1% to 2% being the preferred range. Any type of organosilane coupling agent can be used that is reactive with the particular resin system involved. For a partial list of these materials, reference may be had to the Jerome A. Preston application, Ser. No. 781,618 filed Dec. 5, 1968, and assigned to the assignee of the present application. This application can also be referred to for a list of free radical catalysts useful in crosslinking unsaturated resins. Copolymers that incorporate N-methylol acrylamide, or some other N-methylol unsaturate precursor, crosslink by means of a condensation of the methylol groups to form ether linkages. This reaction is catalyzed by any acid or Lewis acid, as for example any soluble metal salt of a transition metal such as aluminum, calcium, titanium, chromium, magnesium, boron, tin, iron, cobolt, nickel, copper, zinc, strontium, yttrium, etc. The anion should be such as to produce a water soluble salt, e.g. halogens, nitrates, etc. A catalyst is not necessary in all instances, since the reaction can be made to proceed by using heat alone, but in general, the reaction will proceed faster if a catalyst of the type given above is used. The Lewis acids have the further advantage in that they serve as an antistat in the composition. The catalysts act as an electron acceptor for coaction with the nitrogen to activate the hydrogen of the methylol groups. The packages of coated fibers will usually be dried at a temperature above 100° C. but less than 200° C. and preferably between 110° C. and 160° C. to remove the solvent, be it water or an organic solvent, and to crosslink the coating resin into a generally insoluble but still flexible state.

In general, the coating on the glass fibers that is produced according to the present invention will comprise, on a solids basis: from 0.1 to 5.0% of an organosilane coupling agent, and from 50 to 99.9% of an organic film former having two different types of reactivity. The liquid size formulations that are applied to fibers will have the following general formulation in percent by weight:

| | |
|---|---|
| Organosilane coupling agent | 0.1 to 2 |
| Organic film former with two stages of reactivity | 2.0 to 10 |
| Lubricant | 0.1 to 3.0 |
| Solvent | 83.0 to 97.9 |

In the case of a vinyl acetate: N-methylol acrylamide prepolymer, the preferred formulation comprises the following in percent by weight:

| | |
|---|---|
| Organosilane coupling agent | 0.1 to 2.0 |
| Vinyl acetate:N-methylol acrylamide copolymer solids | 4.0 to 8.0 |
| Lubricant | 0.1 to 5 |
| Water | Balance |

While the invention has been described in considerable detail, I do not wish to be limited to the particular embodiments described, and it is my intention to cover hereby all novel adaptations, modifications and arrangements thereof which come within the practice of those skilled in the art to which the invention relates.

I claim:

1. The method of producing glass fiber reinforced resin bonded composites having high impact strength from a matrix forming material comprising a prepolymer having reactive unsaturate bonds and which is soluble in a predetermined solvent, said method comprising: selecting a sizing resin forming prepolymer the precursor of which has reactive double bonds and a reactive crosslinking group selected from the group consisting of alkanol groups, carboxyl groups and oxirane groups, coating a plurality of individual glass fibers with a size comprising the selected sizing resin forming prepolymer, gathering the coated fibers into a strand, causing the crosslinking groups to react and bond the prepolymer molecules together, mixing the coated strand with the matrix resin forming material, and reacting the unsaturate bonds of the matrix resin forming material together and to the double bonds on the surface of the coating on the strand.

2. The method of claim 1 wherein said sizing resin forming prepolymer is a prepolymer of an unsaturate precurser having N-alkanol amide groups, said sizing including a catalyst for the condensation reaction of the alkanol groups.

3. The method of claim 2 wherein the matrix resin forming material comprises an unsaturated polyester resin prepolymer.

4. The method of claim 3 wherein the predetermined solvent is styrene and the matrix resin is a crosslinkable polyester resin.

5. The method of claim 2 wherein the matrix resin forming material comprises a polyolefin prepolymer.

6. The method of claim 2 wherein the matrix resin forming material comprises a polypropylene polymer.

7. The method of claim 1 wherein the sizing resin forming prepolymer comprises the following composition in percent by weight:

| | |
|---|---|
| Organosilane coupling agent | 0.1 to 2.0 |
| Vinyl acetate:N-methylol acrylamide copolymer solids | 4.0 to 8.0 |
| Lubricant | 0.1 to 3.0 |

8. The method of claim 7 including the step of: mixing from 1 to 30 percent by weight of the coated strand with from 70 to 99 percent by weight of a solution of an unsaturated polyester resin.

9. The method of claim 8 wherein the coated strand is dried and heated to a temperature of less than approximately 275° F., and said mixture is heated above approximately 275° F.

10. The method of claim 1 wherein the coating step of the individual glass fibers is performed with a material having the following ingredients in percent by weight:

| Ingredients: | Percent by weight |
|---|---|
| Polyvinyl acetate:N-methylol acrylamide copolymer emulsion | 12 |
| AlCl$_3$ | 0.6 |
| Glycidoxy propyl trimethoxy silane | 0.4 |
| Polyoxyethylene glycol monooleate | 0.6 |
| Acetic acid | 0.004 |
| Deionized water | Balance |

References Cited
UNITED STATES PATENTS

| | | | |
|---|---|---|---|
| 3,085,919 | 4/1963 | Clark | 156—180 X |
| 3,112,234 | 11/1963 | Krupp | 156—180 X |
| 3,116,192 | 12/1963 | Eilerman | 156—180 X |
| 3,117,888 | 1/1964 | Fox | 156—180 X |
| 3,192,089 | 6/1965 | Clark | 156—180 X |
| 3,220,905 | 11/1965 | Doob et al. | 156—180 |
| 3,269,883 | 8/1966 | Shulver et al. | 156—180 X |
| 3,380,877 | 4/1968 | Smucker et al. | 156—180 X |
| 3,467,564 | 9/1969 | Daugherty et al. | 156—180 X |

CARL D. QUARFORTH, Primary Examiner

S. J. LECHERT, JR., Assistant Examiner

U.S. Cl. X.R.

156—167, 180, 242, 269, 296